United States Patent [19]
Fawcett

[11] Patent Number: 5,962,788
[45] Date of Patent: Oct. 5, 1999

[54] TRANSDUCER

[75] Inventor: John Neville Fawcett, Jesmond, United Kingdom

[73] Assignee: BTG International Limited, London, United Kingdom

[21] Appl. No.: 08/791,731

[22] Filed: Jan. 31, 1997

Related U.S. Application Data

[63] Continuation of application No. PCT/GB95/01966, Aug. 18, 1995.

[30] Foreign Application Priority Data

Aug. 18, 1994 [GB] United Kingdom ............. 9416683

[51] Int. Cl.$^6$ .............. G01P 15/00; G01L 1/00
[52] U.S. Cl. ............ 73/514.36; 73/862.381; 73/514.32; 73/514.17
[58] Field of Search .......... 73/514.01, 514.32, 73/514.36, 514.38, 514.17, 514.018, 514.21, 862.381, 862.61

[56] References Cited

U.S. PATENT DOCUMENTS

| | | | |
|---|---|---|---|
| 4,600,934 | 7/1986 | Aine et al. | 428/450 |
| 4,812,199 | 3/1989 | Sickafus | 216/2 |
| 4,919,993 | 4/1990 | Woodruff | 428/134 |
| 4,920,801 | 5/1990 | Church | 73/514.16 |
| 5,000,817 | 3/1991 | Aine | 156/633 |
| 5,005,413 | 4/1991 | Novack et al. | 73/514.36 |
| 5,045,152 | 9/1991 | Sickafus | 156/653 |
| 5,095,752 | 3/1992 | Suzuki et al. | 73/514.35 |
| 5,441,300 | 8/1995 | Yokota et al. | 280/735 |
| 5,528,937 | 6/1996 | Dufour | 73/514.32 |

FOREIGN PATENT DOCUMENTS

| | | | |
|---|---|---|---|
| 301 816 | 2/1989 | European Pat. Off. | G01P 15/08 |
| 322 093 | 6/1989 | European Pat. Off. | G01L 1/14 |
| 89/12830 | 12/1989 | WIPO . | |
| 90/10207 | 9/1990 | WIPO | G01L 1/10 |
| 94/12886 | 6/1994 | WIPO . | |

OTHER PUBLICATIONS

Allen, et al., "Accelerometer Systems with Self-testable Features", Sensors and Actuators, 20(1989), pp. 153–161.

Primary Examiner—Hezron Williams
Assistant Examiner—Richard A. Moller
Attorney, Agent, or Firm—Pillsbury Madiosn & Sutro LLP

[57] ABSTRACT

A force transducer in which a deflectable seismic mass is supported on a frame by support means is disclosed. The seismic mass at rest includes a plane and when the seismic mass is deflected by any force the mass always retains the plane parallel to the rest position. Any deflection of the seismic mass is purely topographically translational movement with no rotational movement allowed. The invention allows three identical structures to be etched onto a flat semiconductor wafer and yet can be used to determine accelerations in three perpendicular directions. As the structures deflect, the surfaces of their seismic masses always remain parallel to the wafer surface. This enables measurement of the deflection to be made easily, for example by depositing electrodes on the surfaces of the seismic masses and fixed surfaces (such as deflection stops) and measuring the change in capacitance between the electrodes. Cross coupling effects will be negligible since each transducer is stiff in all directions except the sensitive direction.

17 Claims, 8 Drawing Sheets

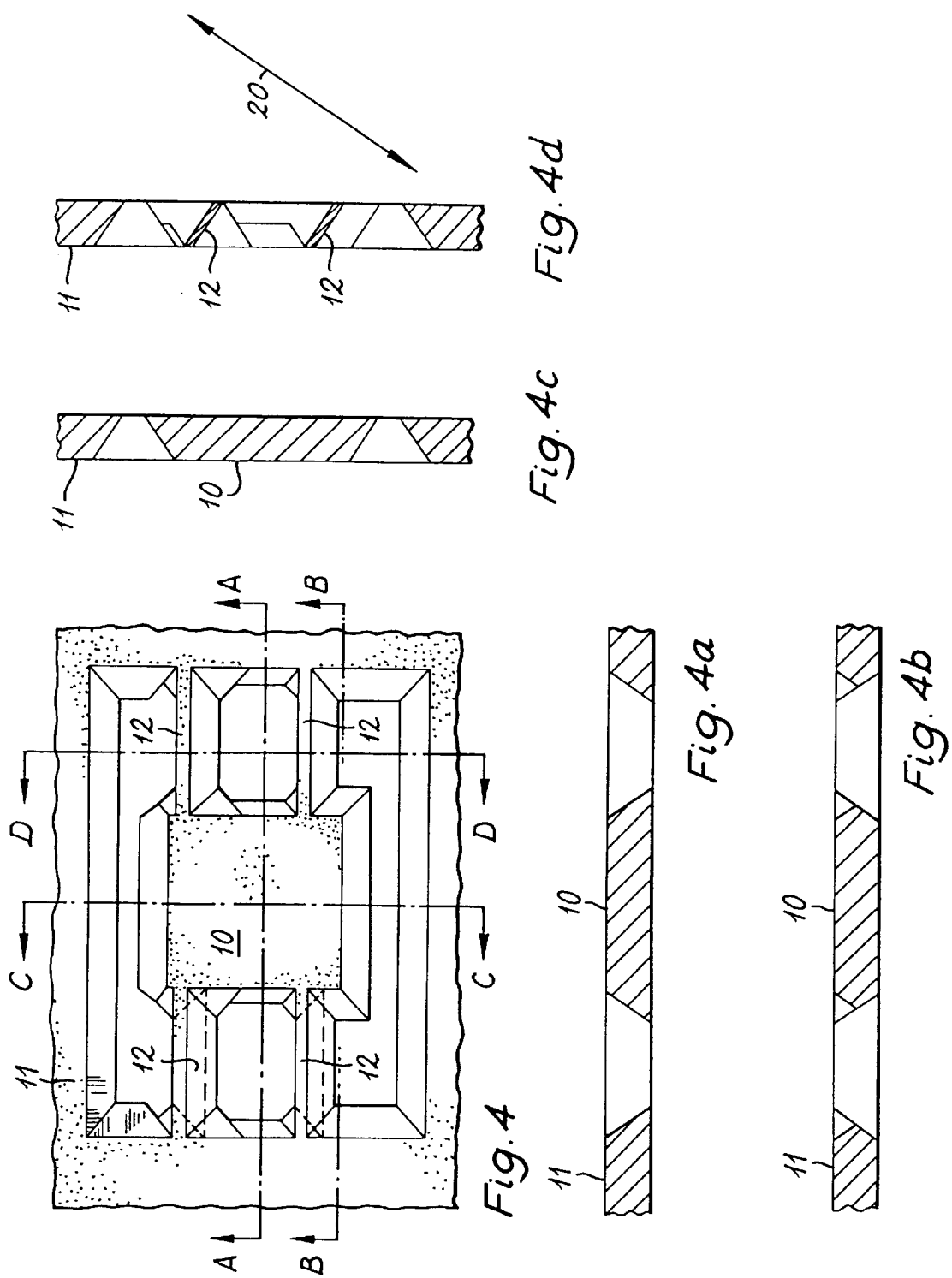

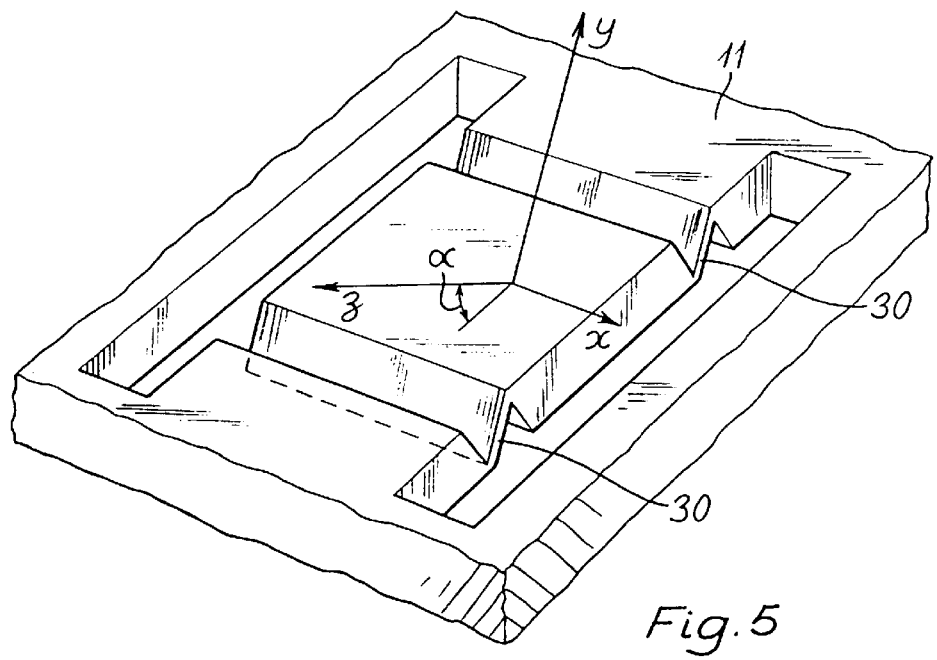
Fig. 5
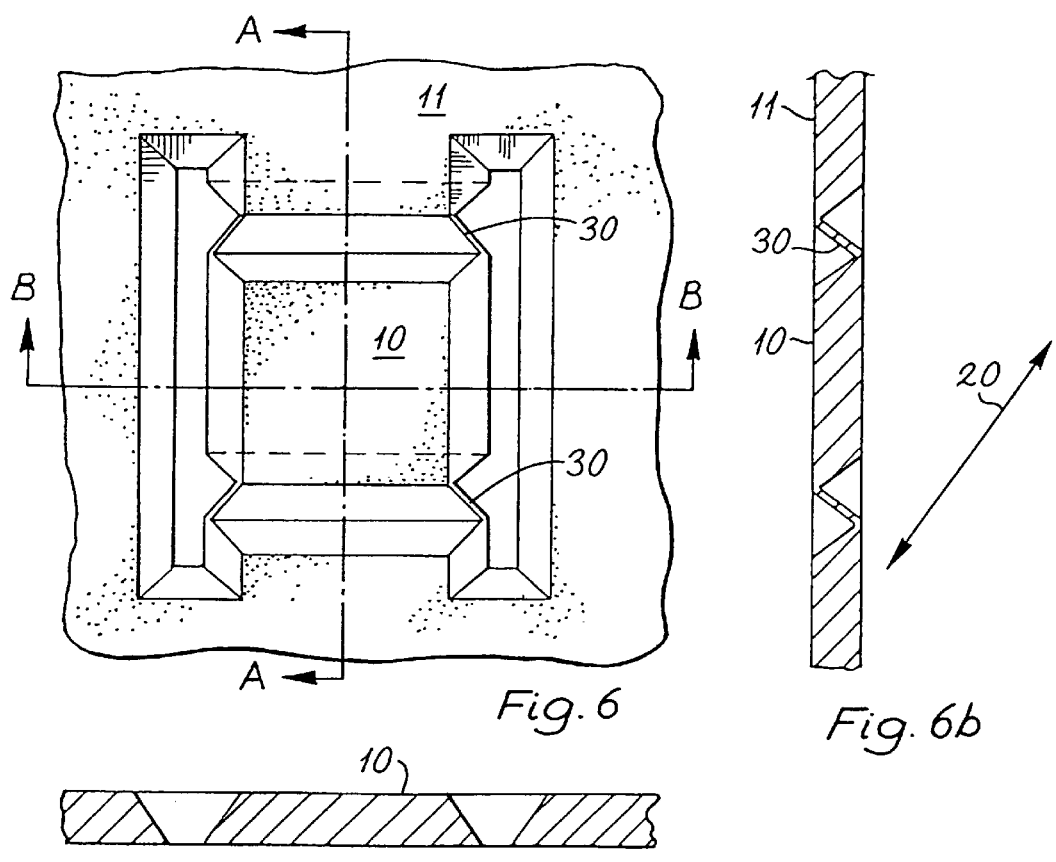
Fig. 6
Fig. 6a
Fig. 6b

TRANSDUCER

This is a continuation of International Appln. No. PCT/GB95/01966 filed Aug. 18, 1995 which designated the U.S.

BACKGROUND OF THE INVENTION

1. Field of the Invention

This invention relates to a transducer for use in an accelerometer or other force transducer and in particular to a micro-accelerometer fabricated as a chip from a semiconductor material wafer using manufacturing techniques analogous to those of integrated circuits. Such micro-accelerometers find applications in the motor and aerospace industries as inputs for control systems; in the motor industry the uses include triggering air bags and as inputs to suspension systems.

2. Description of the Related Art

Micro-accelerometers can be single axis devices, sensitive in a single direction, which are then assembled to form a three dimensional unit. Three axes micro-accelerometers, constructed from a single device which is sensitive in all three dimensions, have structures which require thick slices of base material.

Accelerometers may have to survive over-shocks of hundreds of times their normal operating range and usually employ deflection stops incorporated into the structure to prevent damage. Accelerometers built from single-crystal semiconductor material exhibit very low mechanical loss and need to have controlled damping in order to ensure high-fidelity transduction of acceleration. In "Accelerometer systems with Self-Testable Features" by Allen, Terry and De Bruin, Sensors and Actuators, 20 (1989) 153–161, incorporated herein by reference, a single axis accelerometer having a double cantilever structure is disclosed. Such a device has a seismic mass supported through four silicon springs and the mass can move in a pure translational mode as shown in FIG. 1a. Unwanted rotational modes are also possible as shown in FIGS. 1b and 1c. These rotational modes may be caused by forces which are not perpendicular to the surface of the mass, or by a lack of symmetry in the mass. There will be a tendency for at least one corner of the mass to deflect upwards and the mass will tend to twist, placing an uneven strain on the silicon supports.

EP 322093 A discloses a deflectable seismic mass constructed from a single wafer of silicon. The mass moves rectilinearly in response to a force applied perpendicularly to the surface of the wafer. All of the embodiments disclosed show masses in which movement in the $\{1,1,1,\}$ plane is constrained and which deflect in a plane perpendicular to the $\{1,1,1\}$ plane and the surface of the wafer (the $\{1,0,0\}$ silicon plane). The mass, when subjected to a force which is not perpendicular the $\{1,0,0,\}$ silicon plane, tends to move and rock through the deflectable plane. The mass of FIG. 5 of EP 322093 is constrained to rotate about a line parallel to the $\{1,1,1\}$ silicon plane, positioned at the intersection of the planes defined by flexible members 24" and 26". Thus the motion of the mass is coupled in two of the three dimensions and the device is thus unsuitable for applications where a single axis transducer is required. The devices disclosed are also unsuitable for use in a flat, single wafer device which is sensitive in all three dimensions. As before, a lack of symmetry in the mass will cause unwanted rotational movements.

An example of a three axes single crystal force transducer is shown in WO 94/12886.

SUMMARY OF THE INVENTION

It is an object of the invention to provide a single axis transducer which does not have these disadvantages and where the movement of the seismic mass when deflected is constrained such that the mass remains substantially parallel to its original position. It is a further object of the invention to provide a single axis transducer which can be assembled to form a three dimensional device, constructed from a single wafer of semiconductor material.

According to a first aspect of the invention there is provided a transducer comprising a deflectable seismic mass supported on a frame by support means, said seismic mass at rest including a plane, characterised in that the seismic mass when deflected by any force retains the plane substantially parallel to the rest position.

According to a second aspect of the invention there is provided a transducer comprising a deflectable seismic mass supported on a frame by support means characterised in that any deflection of the seismic mass is purely translational.

According to a third aspect of the invention there is provided a method of manufacturing a transducer according to the first or second aspect.

According to a fourth aspect of the invention there is provided a single axis accelerometer including a force transducer according to the first or second aspect.

According to a fifth aspect of the invention there is provided a three dimensional accelerometer including a force transducer according to the first or second aspect.

The invention also allows three identical structures to be etched onto a flat semiconductor wafer and yet can be used to determine accelerations in three perpendicular directions. The structures deflect such that the surfaces of their seismic masses always remain parallel to the wafer surface. This enables measurement of the deflection to be made easily, for example by depositing electrodes on the surfaces of the seismic masses and fixed surfaces (such as deflection stops) and measuring the change in capacitance between the electrodes. Cross coupling effects will be negligible since each transducer is stiff in all directions except the sensitive direction.

A variety of etching and/or doping techniques may be employed to micromachine the transducer. It may also be possible to include the measuring means on the same wafer as the transducer.

BRIEF DESCRIPTION OF THE DRAWINGS

Embodiments of the invention are described in detail below, by way of example only, with reference to the Figures in which, FIGS. 4a, 4b, 4c and 4d show suitable configurations for the first embodiment, FIG. 5 shows a second embodiment of the invention, FIGS. 6, 6a and 6b show suitable configurations for the second embodiment.

DETAILED DESCRIPTION OF THE INVENTION

Figure 1A:
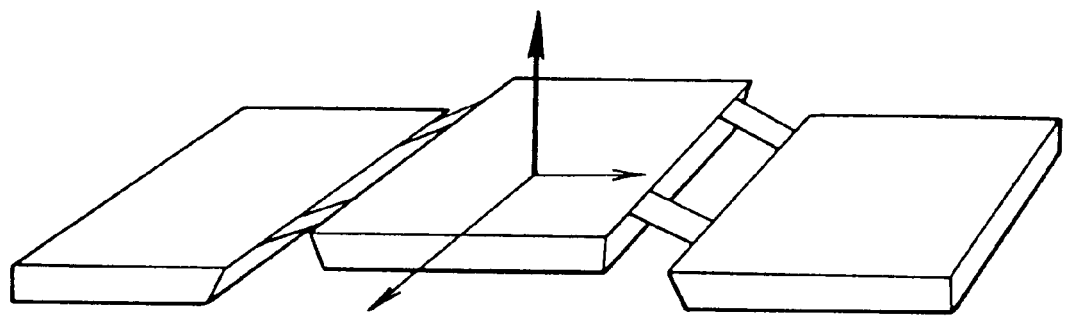
FIGS. 1a, 1b and 1c illustrate the three modes of motion of the prior art.
Figure 1B:
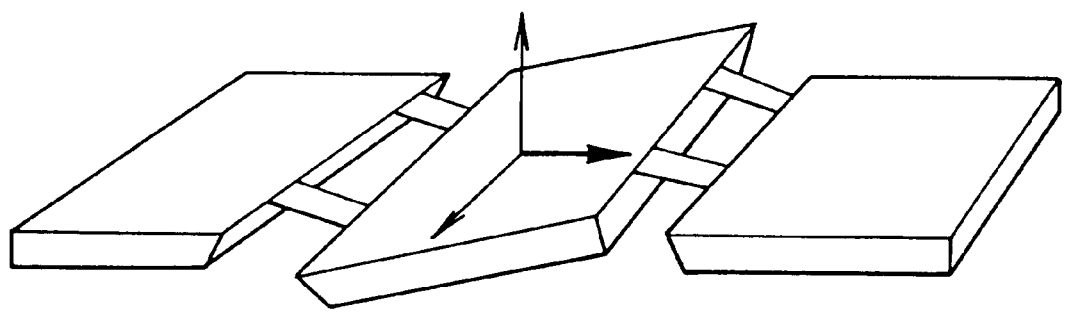
Figure 1C:
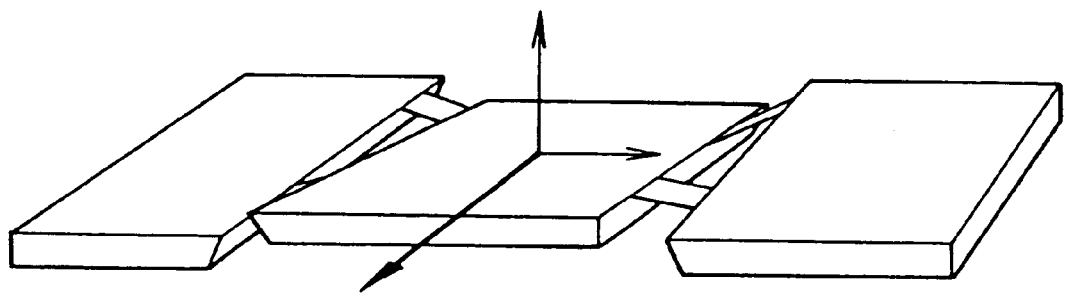
Figure 2:
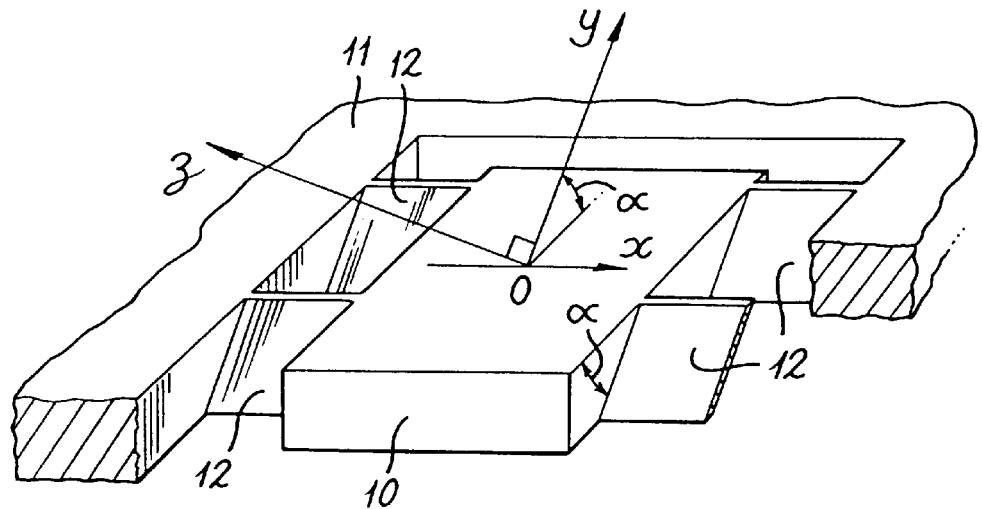
FIG. 2 shows a first embodiment of the invention.

FIG. 2 shows a first embodiment of the invention employing a quad bridge structure. The transducer consists of a seismic mass 10 supported on a frame 11 by four flexible support elements 12. The flexible support elements consist of thin parallel beams formed at an angle α to the surface of the mass. Taking the three perpendicular axes Ox, Oy and Oz, with the Ox axis parallel to the longitudinal axis of the beams and Oz perpendicular to the face of the beams, the device is stiff in the Ox and Oy directions but will, when subjected to a force, deflect in the Oz direction. The deflection of the mass, or the force required to maintain a null position, can be used as a measure of the acceleration of the mass.

Figure 3A:
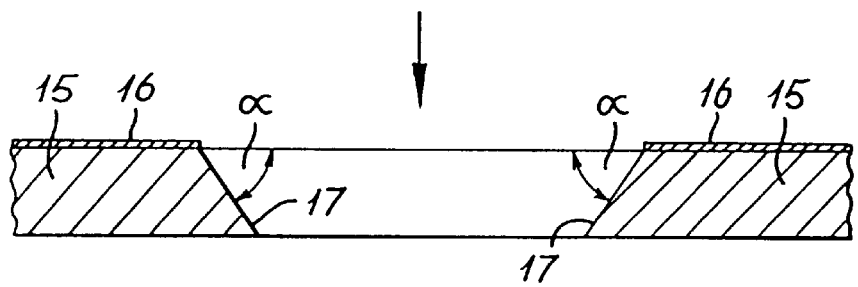
FIGS. 3a and 3b show a process for etching the first embodiment.
Figure 3B:
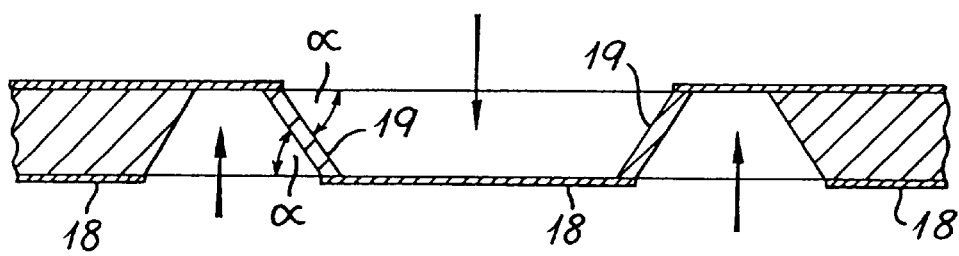

This embodiment utilises the natural etch properties of (1,0,0) silicon. FIG. 3a shows a section through a silicon slice or wafer 15 the upper surface of which has been masked, by a mask 16, over some of its area. When etched through the mask the cavity formed always has flat walls which lie at an angle α to the surface of the slice. In (1,0,0) silicon this angle is 54.7° and the walls 17 formed correspond to (1,1,1) surfaces. FIG. 3b illustrates that by etching similar cavities in the underside of the silicon slice, with appropriate masking, by a mask 18, and timing of the etching process, it is possible to produce thin beams 19 suitable for use in the transducer. Alternatively, instead of using the mask 18 the walls 17 may be doped, for example with boron. The doped areas are impervious to etchant and will remain after the etching process is complete. It would be possible to etch both sides simultaneously, or to etch sequentially.

FIG. 4 shows a suitable configuration, with FIG. 4a, 4b, 4c and 4d showing the respective cross sections A—A, B—B, C—C and D—D. Variations in the detailed shape of the seismic mass 10, the frame 11 and the support elements 12 will depend on the type of mask and etching process used. The sensitive direction is shown by the arrow 20.

FIG. 5 shows an second embodiment in which the four support elements are replaced by two support beams 30 attaching the seismic mass 10 to the frame 11. Taking the three perpendicular axes Ox, Oy and Oz, with the Ox axis in the plane of the mass and parallel to the plane of the mass and Oz perpendicular to the plane of the beam, the device is stiff in the Ox and Oy directions but will, when subjected to a force, deflect in the Oz direction. As with the first embodiment the deflection of the mass, or the force required to maintain a null position, can be used as a measure of the acceleration of the mass.

FIG. 6 shows a suitable configuration, with FIGS. 6a and 6b showing the respective cross sections A—A and B—B. As with the first embodiment, variations in the detailed shape of the seismic mass 10, the frame 11 and the support elements 30 will depend on the type of mask and etching process used. The sensitive direction is shown by the arrow 20.

Figure 7:
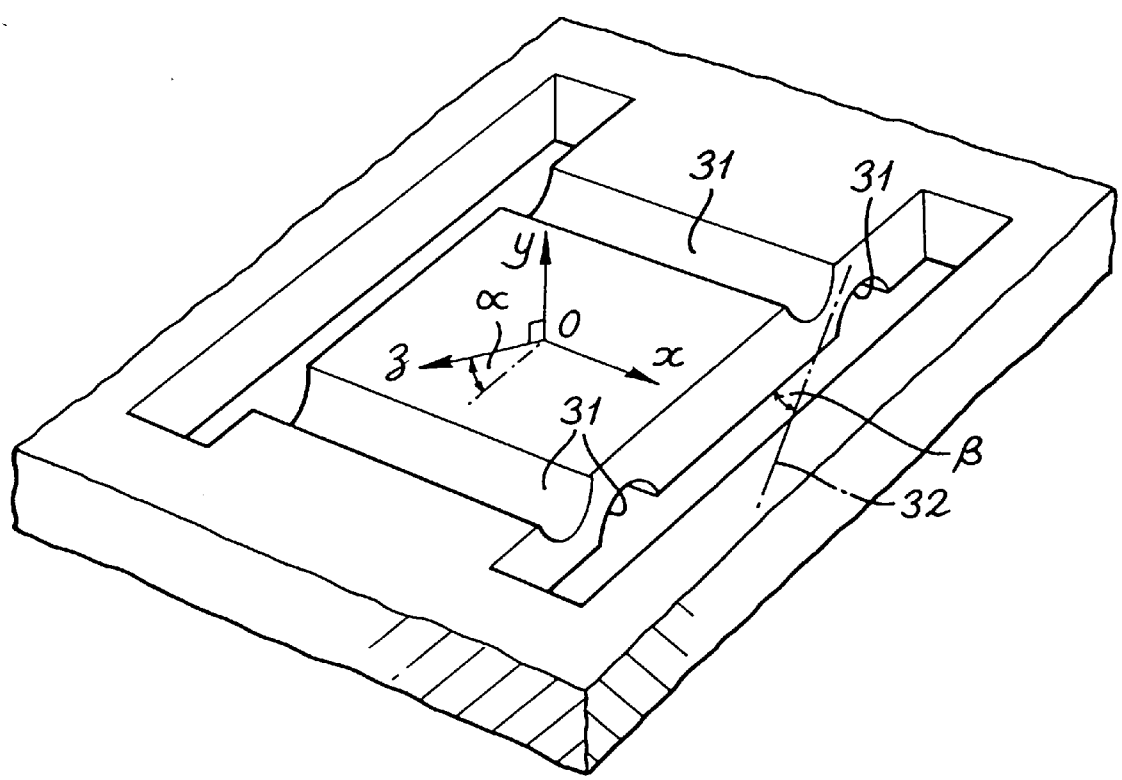
FIG. 7 shows an alternative arrangement for the second embodiment

FIG. 7 shows an alternative second embodiment to the example illustrated in FIG. 5. The etching of the two support beams does not depend upon the crystal orientation. The semicircular grooves 31 are produced by an isotropic etching process and if appropriately offset can produced a line of flexure at an angle β to the surface of the seismic mass. The angle β could range from 0° to 90° but would realistically be in the range 30° to 60°. The most sensitive and convenient angle would be 45°.

Figure 8:
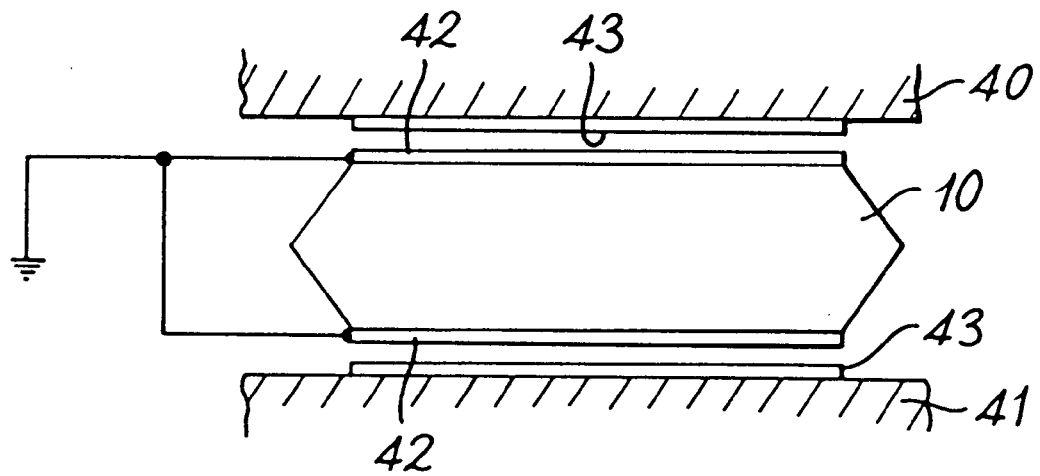
FIG. 8 shows an arrangement for measuring the deflection of the seismic mass.

FIG. 8 shows a cross section of the mass 10, between an upper deflection stop 40 and a lower deflection stop 41. Pairs of electrodes 42,43 may be deposited directly onto the mass and the fixed surfaces of the deflection stops to form a push-pull capacitor. Since both the upper and lower surfaces of the mass remain parallel to the fixed surfaces of the deflection stops, the change in the capacitance between the electrodes on the fixed surfaces and the electrodes on the movable surfaces will be a direct measure of the amount of deflection of the mass, and thus the acceleration.

Figure 9:
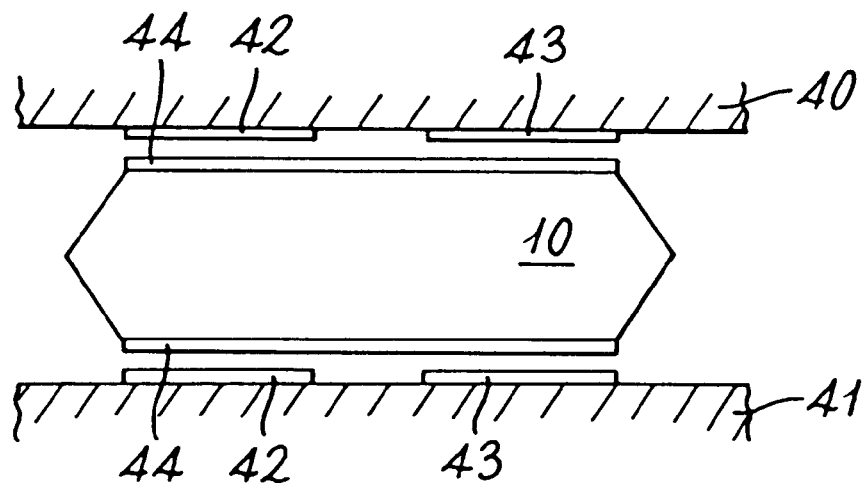
FIG. 9 shows an alternative arrangement for measuring the deflection of the mass.

FIG. 9 shows an alternative arrangement which avoids the need for supplying an electrical connection to the mass. A pair of electrodes 42,43 is deposited on the upper deflection stop 40 and the lower deflection stop 41. A conducting layer 44 is deposited on the upper and lower surfaces of the mass 10. Electrodes 42,44 and 43,44 form two capacitors in series at each of the upper and lower gaps. As with the previous arrangement, the change in the capacitance will be a direct measure of the amount of deflection of the mass, and thus the acceleration.

The arrangements illustrated in FIGS. 8 and 9 may be arranged to have only one set of electrodes at either the upper or lower gap.

Figure 10:
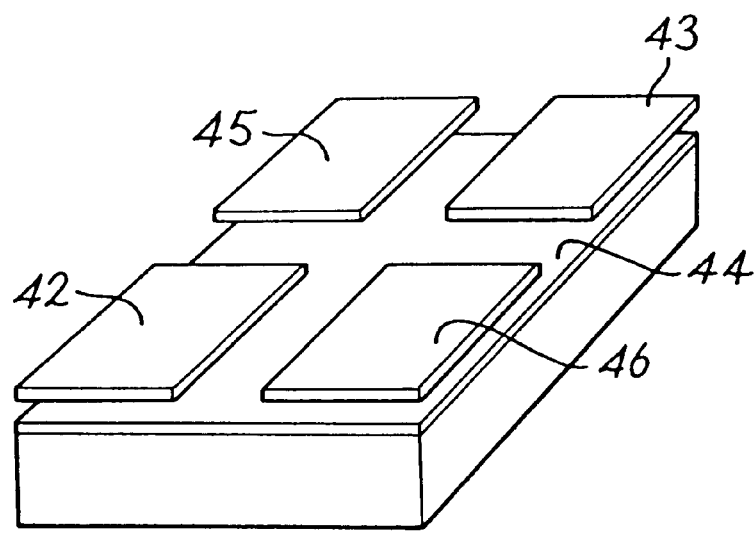
FIG. 10 shows a null arrangement for measuring the deflection of the mass.

FIG. 10 shows a null arrangement whereby the deflection of the mass is counteracted. A conducting layer 44 is deposited on a surface of the mass 10 adjacent to a deflection stop (not shown). Pairs of electrodes 42,43 are deposited on the deflection stop and as with the arrangement illustrated in FIG. 8, the change in the capacitance will be a direct measure of the amount of deflection of the mass, and thus the acceleration. Two actuators 45,46, also deposited on the deflection stop, are used the counteract the deflection of the mass by means of suitable voltages applied to electrodes 45 and 46.

Figure 11:
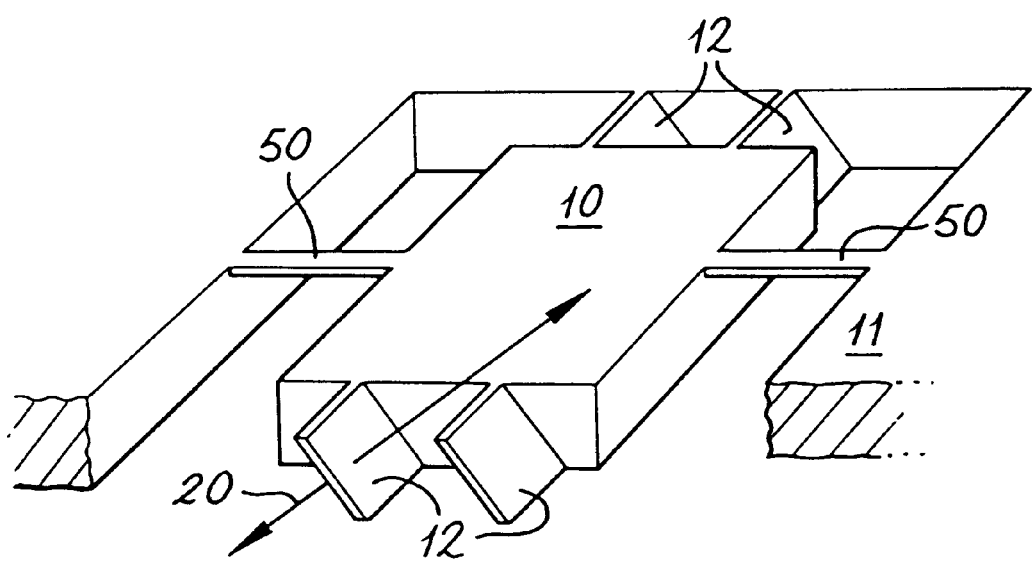
FIG. 11 shows a null construction for the first embodiment of the invention and FIG. 12 shows the orientation of three transducers in a three dimensional structure.

An alternative null arrangement would be to constrain the movement of the seismic mass using established techniques. For example, FIG. 11 shows an null arrangement for the first embodiment illustrated in FIG. 2 and consists of a seismic mass 10 supported on a frame 11 by four flexible support elements 12. Two thin null beams 50 prevent movement of the mass; any force applied on the mass in the sensitive direction (marked by arrow 20) will apply a tensile load to one beam and a compressive load to the other beam. If the beams are caused to vibrate at their natural frequencies of transverse vibration, these natural frequencies will change as the tensile and compressive loads change. The differences in the natural frequencies of these beams is proportional to the acceleration of the mass.

Figure 12:
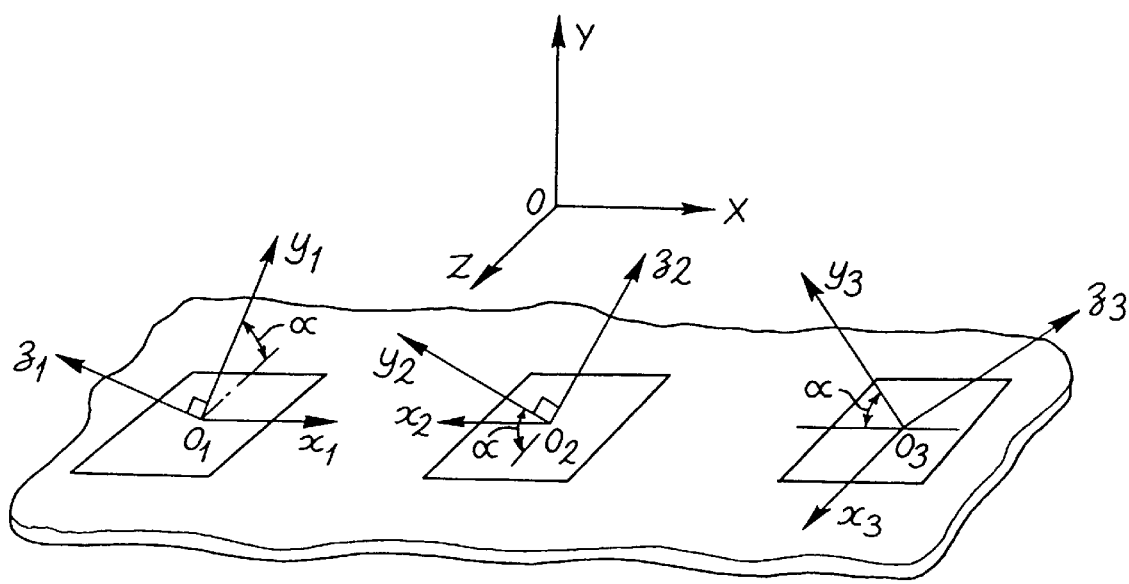

FIG. 12 shows a three dimensional layout where three of the single axis devices can be produced on a single wafer of silicon. The properties of (1,0,0) silicon are such that it is possible to produce two or more identical transducers which are rotated, about an axis normal to the wafer (OY), by 90° intervals relative to the first device. In FIG. 12 $O_1z_1$, $O_2z_2$ and $O_3z_3$ are the sensitive directions for each transducer. If the acceleration components measured along $O_1z_1$, $O_2z_2$ and $O_3z_3$ are $a_1$, $a_2$ and $a_3$ respectively, the accelerations A along the three perpendicular axes Ox, Oy and Oz are $A_x = a_3 \sin \alpha$ $A_y = (a_1 + a_2 + a_3) \cos \alpha$ $A_z = (a_1 - a_2) \sin \alpha$ If the embodiment of FIG. 7 is used, with a sensitive direction at 45° to the surface of the wafer, the three devices will have mutually perpendicular sensitive directions. Thus $a_1$, $a_2$ and $a_3$ may be used in place of $A_x$, $A_y$ and $A_z$ and no further computation is required.

I claim:

1. A transducer comprising a deflectable seismic mass supported on a frame by support structure, said seismic mass having a surface, a plane of said surface being disposed in a first orientation when said seismic mass is disposed in a rest position wherein the support structure comprises a plurality of parallel beams each extending at an angle α relative to said plane of said surface whereby when the seismic mass is deflected by a force, irrespective of a direction of the force, the plane of said surface will be disposed in an orientation substantially parallel to said first orientation.

2. A transducer as claimed in claim 1 wherein the seismic mass deflects along a single axis, said single axis being oriented in a direction that is substantially perpendicular to a plane of a surface of a said support beam when said seismic mass is disposed in the rest position.

3. A transducer as claimed in claim 2 characterised in that the parallel beams are stiff in directions perpendicular to said single axis.

4. A transducer as claimed in claim 2 characterised in that the transducer includes a a deflecting surface of the seismic mass having an inner electrode and a fixed surface parallel to said deflecting surface and having an outer electrode, said inner and outer electrodes having a capacitance which changes when the seismic mass is deflected.

5. A transducer as claimed in claim 4 characterised in that the transducer includes actuators, responsive to the change in capacitance, which counteract the deflection of the mass.

6. An transducer as claimed in claim 1 wherein the transducer includes null members, vibrating at a natural frequency, which prevent the deflection of the mass and are subjected to compressive and tensile loads when a force is applied to the mass, thereby causing or permitting a change in the frequency of the vibration.

7. A multi-directional transducer comprising at least two transducers, each said transducer comprising:

a deflectable seismic mass supported on a frame by support structure, said seismic mass having a surface, a plane of said surface being disposed in a first orientation when said seismic mass is disposed in a rest position, wherein the support structure comprises a plurality of parallel beams each extending at an angle α relative to said plane of said surface whereby when the seismic mass is deflected by a force, irrespective of a direction of the force, the plane of said surface will be disposed in an orientation substantially parallel to said first orientation, wherein the seismic mass of each said transducer deflects along a single axis, and wherein the transducers are arranged such that said axes of deflection are not parallel to one another.

8. A multi-directional transducer as claimed in claim 7, each transducer including a second plane which is parallel to said surface of said seismic mass and intersects all parallel support beams thereof wherein the second planes of each seismic mass are parallel to one another.

9. A multi-directional transducer as claimed in claim 8, wherein the second planes of each seismic mass remain parallel when deflected by a force irrespective of a direction thereof.

10. A multi-directional transducer as claimed in claim 8, wherein each said second plane is parallel to said plane of said surface and at rest the second planes of each seismic mass are coplanar.

11. A multi-directional transducer as claimed in claim 7, wherein there are three transducers and the transducers are arranged such that said axes of deflection are mutually orthogonal.

12. A method of manufacturing a transducer comprising:

providing a substrate for defining a frame;

forming a deflectable seismic mass and a support structure for supporting said seismic mass on said frame, said seismic mass having a surface, a plane of said surface being disposed in a first orientation when said seismic mass is disposed in a rest position, said step of forming a support structure comprising forming a plurality of parallel beams to extend between said seismic mass and said frame, each said parallel beam extending at an angle α relative to said plane of said surface, whereby when the seismic mass is deflected by a force, irrespective of a direction of the force, the plane of said surface will be disposed in an orientation substantially parallel to said first orientation.

13. A method of manufacturing a transducer as claimed in claim 12, wherein the transducer is manufactured from a single crystal of semiconductor material.

14. A method of manufacturing a transducer as claimed in claim 13 wherein the single crystal of semiconductor material is etched using anisotropic etching.

15. A method of manufacturing a transducer as claimed in claim 13 wherein the single crystal of semiconductor material is etched using isotropic etching.

16. A single axis accelerometer including a force transducer comprising:

a deflectable seismic mass supported on a frame by support structure, said seismic mass having a surface, a plane of said surface being disposed in a first orientation when said seismic mass is disposed in a rest position, wherein the support structure comprises a plurality of parallel beams each extending at an angle α relative to said plane of said surface whereby when the seismic mass is deflected by a force, irrespective of a direction of the force, the plane of said surface will be disposed in an orientation substantially parallel to said first orientation.

17. A three dimensional accelerometer including three force transducers each comprising:

a deflect able seismic mass supported on a frame by support structure, said seismic mass having a surface, a plane of said surface being disposed in a first orientation when said seismic mass is disposed in a rest position, wherein the support structure comprises a plurality of parallel beams each extending at an angle α relative to said plane of said surface whereby when the seismic mass is deflected by a force, irrespective of a direction of the force, the plane of said surface will be disposed in an orientation substantially parallel to said first orientation.

* * * * *